United States Patent

[11] 3,561,555

[72] Inventor James W Carmichael
  Clearwater, Fla.
[21] Appl. No. 829,022
[22] Filed May 29, 1969
[45] Patented Feb. 9, 1971
[73] Assignee Haja, Inc.
  Miami, Fla.

[54] POWER ATTACHMENT UNIT FOR GOLF BAG CARTS
  8 Claims, 7 Drawing Figs.
[52] U.S. Cl.......................................... 180/11, 280/36
[51] Int. Cl........................................... B60k 1/04
[50] Field of Search............................ 280/MG C; 180/11, 65, 25A

[56] References Cited
  UNITED STATES PATENTS

| | | | |
|---|---|---|---|
| 2,962,106 | 11/1960 | Burnside et al. | 180/19 |
| 3,059,713 | 10/1962 | Beggs | 180/65 |
| 3,094,185 | 6/1963 | Racoosin | 180/11 |
| 3,167,146 | 1/1965 | Rudolph | 180/19 |
| 3,330,371 | 7/1967 | Seaman | 180/11 |

Primary Examiner—Benjamin Hersh
Assistant Examiner—Robert R. Song
Attorney—Beveridge & De Grandi ABSTRACT: A power attachment unit for golf bag carts comprising a curved support tube whose lower end is fixed to an inverted yoke support having mounted therein a wheel to be power driven by means of a motor and gear assembly mounted to one side of the yoke support. To the other side of the yoke support is fixed a battery case containing a battery for energizing the motor. The support tube is mounted to the vertical stem of the push cart by means of a releasable and adjustable clamping bracket. An electrical control unit is mounted by a second clamping bracket to the handle of the push cart for controlling the speed of the motor and in turn the power driven wheel. Electrical lines between the control unit and the battery and the motor are partly housed through the support tube.

INVENTOR
JAMES W. CARMICHAEL
BY
Beveridge & DeGrandi
ATTORNEYS

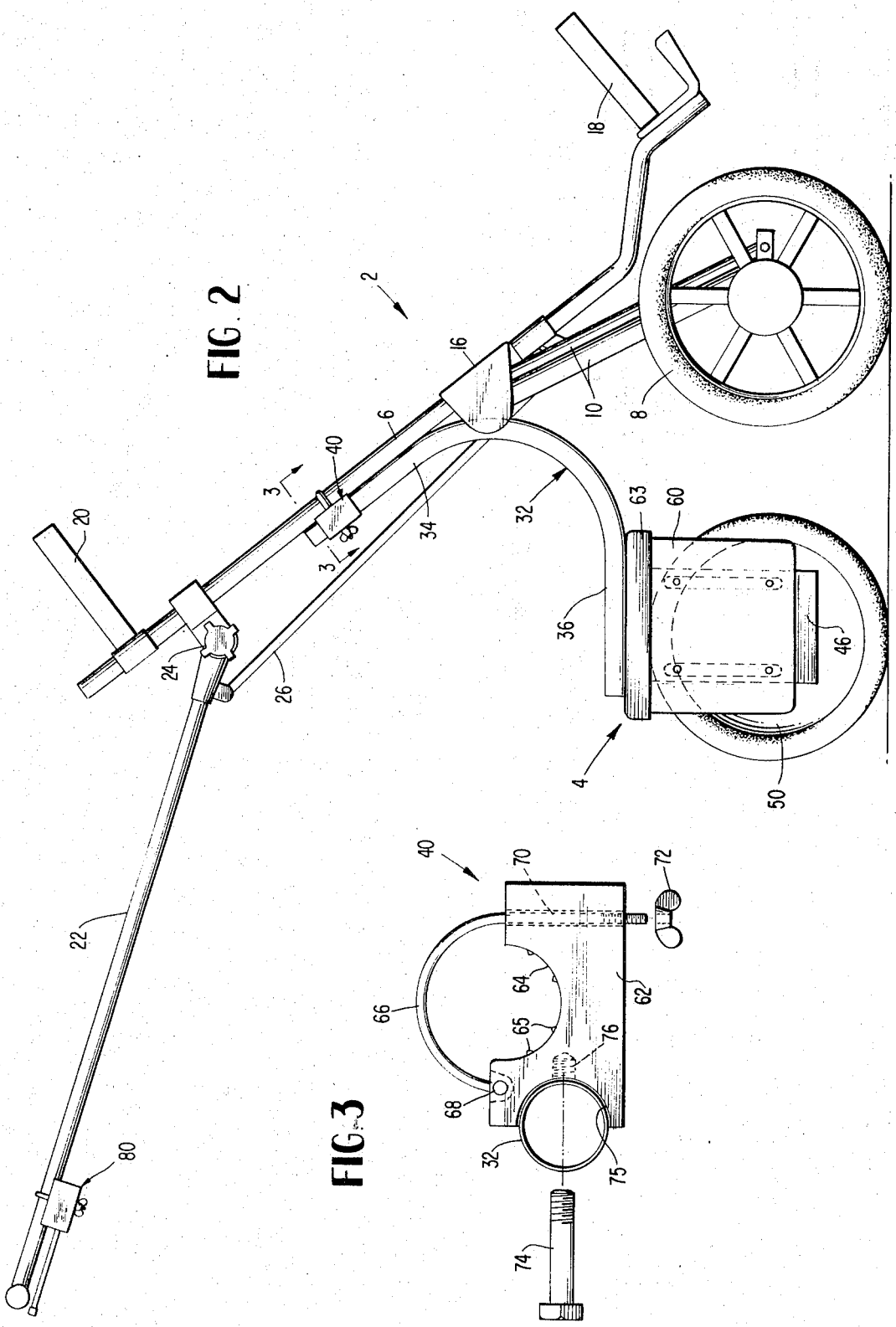

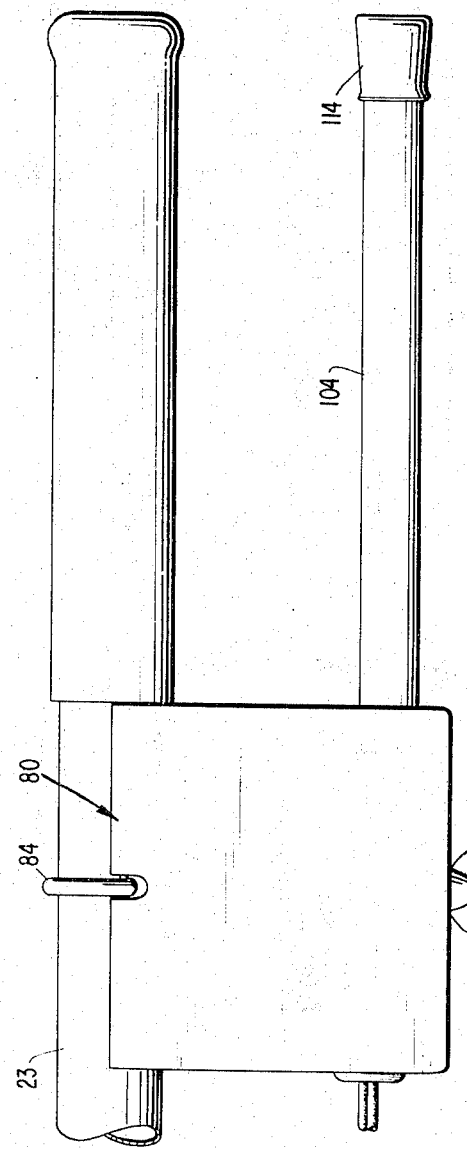
FIG. 4
FIG. 5
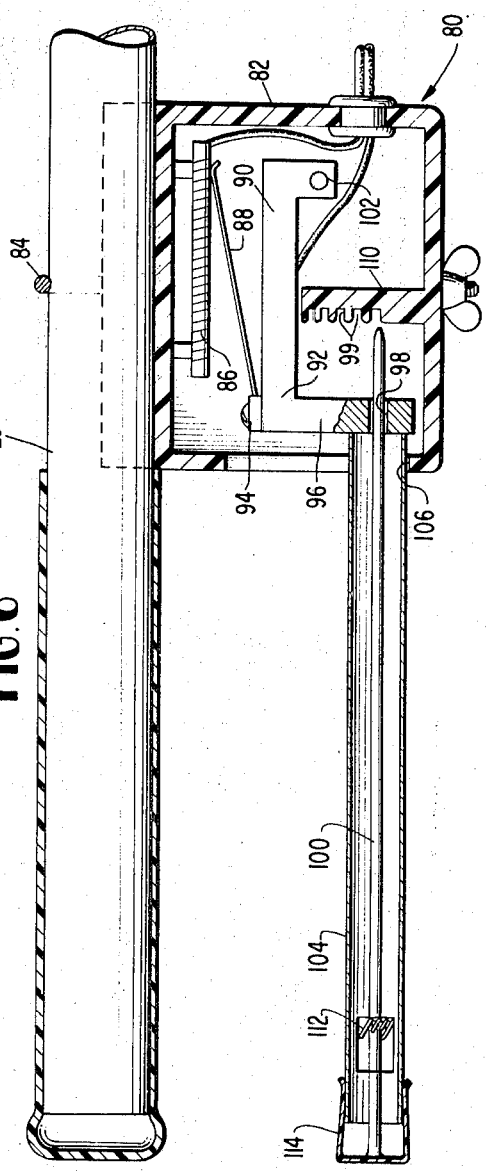
FIG. 6
FIG. 7

3,561,555

POWER ATTACHMENT UNIT FOR GOLF BAG CARTS

SUMMARY OF INVENTION AND OBJECTS

This invention relates to a novel power attachment unit which may be mounted to a golf bag push cart to drive the same.

One of the objects of the present invention is to provide a novel power attachment unit having a relatively simple and uncomplicated construction that may be quickly and easily attached to conventional or other golf bag carts to drive the same under power without altering the basic mode of manipulating the cart. Included herein is the provision of such an attachment which incorporates a power driven wheel that is mounted between the conventional wheels of the cart at an effective balancing point for the cart.

A further object of the present invention is to provide such a power attachment unit which is adjustable so that it may be mounted to carts of various sizes as well as to provide proper three-wheel balance for the cart.

A still further object of the present invention is to provide a novel manually operable control for changing the speed of the power driven wheel in the attachment, which control may be adjustably mounted at the handle of the cart for convenient operation.

Yet a further object of the present invention is to provide such an attachment unit which may be manufactured at relatively low cost and with a compact construction enabling it to be stored for example in the trunk of an automobile when not in use. Included herein is the provision of such a power attachment unit that may be manufactured with a durable construction that will give dependable service over long periods of repeated and rugged use.

Achieving the above objects is an attachment unit including a main support tube having adjacent its upper end, a clamping bracket which may be releasably secured to the main support stem of a golf bag cart in any adjustable position along the main support stem. The attachment support tube is shaped to curve downwardly and then rearwardly of the cart with its end portion extending generally horizontally for properly positioning a yoke bracket secured to the tube end portion in inverted fashion. In the legs of the yoke shaped bracket, is mounted a wheel to be driven under power through means of a motor and gear assembly mounted to one of the legs of the yoke shaped bracket and a battery mounted with respect to the other leg of the bracket through means of a battery case.

The speed of the motor and in turn the power driven wheel is controlled through a unit that is attached to the handle of the cart for convenient manipulation. This control unit includes a rheostat coil and an associated contact which may be moved and locked into several different positions engaging the coil by means of a manual control lever and locking rod. The electrical lines between the control unit, motor and battery are partly housed in the hollow of the main support tube.

Other objects and advantages of the present invention will become apparent from the attached drawings in which:

FIG. 2 is a side view of the cart and attachment unit shown in FIG. 1;

FIG. 3 is an enlarged view of a clamping bracket employed to secure the attachment unit relative to the main support stem of the cart;

FIG. 4 is a side view of a control unit which is mounted to the handle of the cart for controlling the speed of the power driven wheel of the attachment unit;

FIG. 5 is an end view of the control unit as seen from the left end of FIG. 4; FIG. 6 is a cross-sectional view taken along 6–6 of FIG. 4 showing the internal parts of the control unit; and FIG. 7 is an end view of the control unit as seen from the left end of FIG. 6.

DETAILED DESCRIPTION

Figure 1:
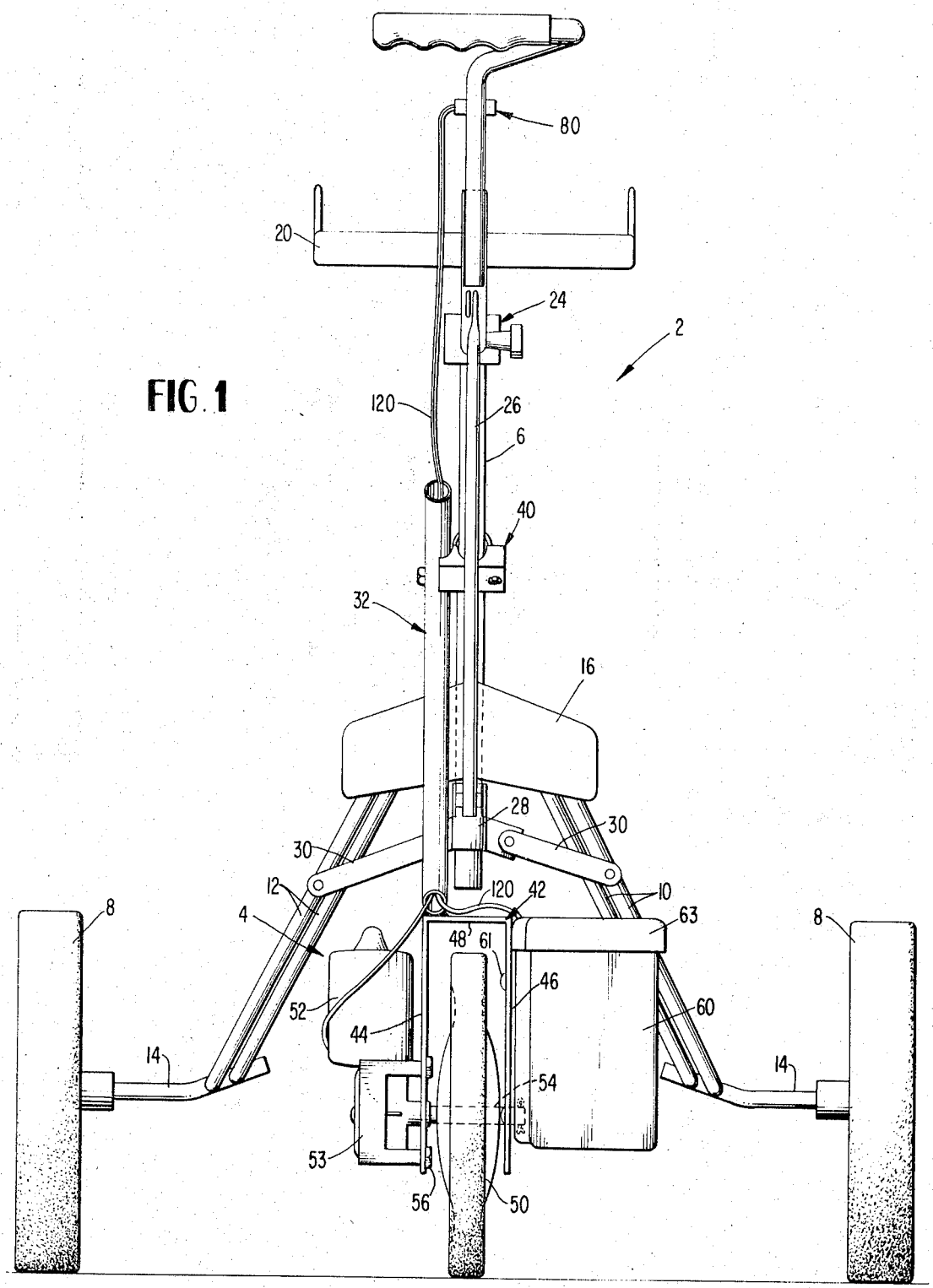
FIG. 1 is an elevational view of a conventional golf bag push cart as seen from the rear end thereof and with the cart incorporating a power attachment unit representing one embodiment of the present invention.

Referring now to the drawings in detail, FIGS. 1 and 2 illustrate a conventional golf bag push cart generally designed 2 and a power attachment unit generally designated 4, embodying the invention, mounted to the cart to drive the same forwardly under power. Push cart 2 typically includes a main support stem 6 mounted on a pair of wheels 8 by means of diagonal support struts 10 and 12 which extend between the wheel axles 14 and a transverse connecting bar 16 secured intermediate the ends of main support stem 6. The cart is adapted to receive a golf bag (not shown) along the main support stem 6 between a lower bag rest 18 and an upper element 20 to which the bag is releasably secured in any suitable manner. In normal use, that is without the power attachment unit 4, the cart is pushed manually through means of a rod 22 which projects rearwardly of the cart and is mounted at its forward end to stem 6 through means of an adjustable clamp 24. Also illustrated is a conventional support strut 26 extending between connecting bar 16 and rod 22. Support strut 26 furthermore may be connected to a sliding sleeve 28 which in turn is pivotally connected through links 30 to diagonal struts 10 and 12 inwardly to collapse the wheels for storage.

Attachment unit 4 of the present invention includes a main support tube which may be formed from aluminum or similar material formed into a generally open V or U shape. The main support tube 32 includes a first leg 34 which is adapted to be attached alongside stem 6 of the cart by means of a clamping bracket assembly 40, and a second leg 36 which extends generally horizontally when the tube 32 is attached to cart stem 6. Tube section 36 is secured such as by welding or in any suitable manner to an inverted yoke shaped support bracket 42 including opposite legs 44 and 46 interconnected by a top wall 48 to which the tube section 36 is attached along one side edge thereof. Support bracket 42 may be made from any suitable lightweight material of sufficient strength such as aluminum.

Journaled for rotation in yoke bracket 42 is a wheel 50 to be driven by a motor 52 operatively connected to the wheel shaft 54 through means of any suitable or conventional gear and worm assembly located in a gear casing 54. The latter is secured to leg 44 of the yoke bracket 42 by means of any suitable fasteners shown as 56.

Motor 52 is powered by a battery (not shown) located in a case 60 secured to the other leg 46 of the yoke bracket 42. This securement is by any suitable means such as bolts 61 extending through apertures in bracket leg 46 and the side wall of battery case 60. In addition a top cover 63 is provided for the battery case to enclose sufficient space above the battery for receiving a charging device (not shown) if desired.

Referring to FIG. 3, clamping bracket 40 includes a block 62 which may be formed from aluminum for example, having a semicylindrical open passage 64 formed in one side face thereof for receiving main support stem 6 of the cart to which it is releasably secured by means of a clamping strap or arm 66 pivoted to the block 68 so as to be movable into or out of engagement with stem 6. The extremity portion 70 of clamp arm 66 extends through a passage formed in block 62 and is threaded at its end to receive a wingnut 72 for purposes of securing the clamp arm on the stem 6. It will be seen that prior to securing wingnut 72 on the arm 66, the block may be slid along main support stem 6 into proper adjusted position after which wingnut 72 may be advanced to secure clamp arm 66 on stem 6. In addition, a plurality of projections 65 may be formed on the surface 64 of the block to enhance engagement between stem 6 and the latter.

In the specific embodiment shown, block 62 is secured to main support tube 32 of the attachment by means of a bolt 74 which is receivable through transverse apertures in tube 32 and into a threaded passage 76 formed in the block 62. In addition, block 62 is formed with a semicylindrical passage 75 for receiving a portion of the main support tube 32 as illustrated in FIG. 3.

In order to vary the speed of motor 52 to thereby change the speed of power driven wheel 50, a control unit generally designated 80 is provided to be releasably mounted to the handle end 23 of rod 22. Referring to FIG. 6 control unit 80 includes a casing 82 which may be clamped to handle section 23 by means of a clamp arm or a strap 84 (see FIGS. 4 and 5) which is similar to the clamp arm 66 described above in connection with clamping bracket 40. Casing 82 encloses a resistance coil 86 suitably fixed to one sidewall of casing 82, and a movable spring contact 88 adapted to be moved into different degrees of engagement with coil 86 to vary the resistance of the motor circuit and in turn the speed of the motor.

Spring contact 88 is actuated through means of pivot arm 90 having a first portion 92 to an end of which, contact 88 is secured by a fastener 94. Arm 90 includes a second portion 96 extending at right angles to portion 92. Arm 92 is pivoted at 102 to casing 82, and a hollow tubular operating lever 104 is secured to arm portion 96 to pivot the same about 102 into various positions which will increase or decrease the engagement between contact spring 94 and resistance coil 86. Lever 104 projects from casing 82 through a passage 106 and terminates adjacent the end of handle section 23 to facilitate manipulation by the user.

In order to lock pivot arm 90 in a selected speed position, a push rod 100 is coaxially mounted within lever 104 to extend at its inner end through a passage 98 formed in pivot arm section 96 and to be receivable in one of several grooves 99 formed in a lock member 110 fixed to casing 82. Locking rod 100 is biased by a suitable spring mechanism generally designated 112 inwardly towards grooves 99 in stationary lock member 110. However lock rod 100 may be withdrawn relative to lever 104 to remove it from grooves 99 to allow pivot arm 90 to be moved into a different position. This is achieved through a pushbutton cap 114 secured to the outer end of lock rod 100 for convenient manipulation by the user.

It will be seen that in order to change the speed of motor 52, the operator merely pulls rod 100 outwardly to release it from the locking grooves in lock member 110 and then moves lever 104 until the rod registers with another groove 99 in lock member 110 whereupon release of pushbutton cap 114 will allow spring 112 to automatically retract the rod into the selected groove in lock member 110. While the specific embodiment permits four different speeds to be obtained, it will be appreciated that more or less will be obtainable by employing a greater or lesser number of grooves 99 in locking member 110. Although not shown, any conventional circuit may be employed in connecting the control unit 80 with the motor 52 and the battery. In addition, the electrical cord 120 between the battery, the motor and the control unit may be passed through the hollow of the main support tube 32 as indicated. Additionally and although not shown suitable plug receptacles may be provided in one or more of the battery, the motor and the control unit to facilitate connection and disconnection of the circuit.

I claim:

1. A power attachment unit for driving a golf bag cart including in combination, a main support member having a first portion adapted to be attached in generally parallel relation to a support stem of a golf bag cart, and a second portion integral with said first portion extending at an angle to said first portion and rearwardly of said support stem when attached thereto, a support bracket having opposite sidewalls interconnected by a top wall, said second main support portion being fixed to the top wall of said bracket with the sidewalls extending away from said main support member, a wheel to be driven journaled for rotation to and between said bracket sidewalls exteriorly thereof, a motor and gear assembly mounted to one of said walls for driving said wheel, a battery for energizing said motor, and means mounting said battery to the other bracket sidewall exteriorly thereof.

2. The attachment defined in claim 1 wherein said main support member is secured to said bracket top wall offset to one side thereof.

3. The attachment defined in claim 1 wherein said main support member is elongated and has a generally open U-shape.

4. The attachment defined in claim 3 wherein said elongated main support member is tubular and wherein there is further included a variable resistance control unit adapted to be mounted on the handle of a golf bag cart with electrical lines interconnecting the control unit and the motor and the battery while being partly housed in said tubular support member.

5. The attachment defined in claim 1 further including a clamping bracket means fixed to said main support member and projecting laterally therefrom for releasably securing said main support member to a support stem of a golf bag cart in side by side relationship.

6. The attachment defined in claim 5 wherein said clamping bracket means includes a block fixed to said main support member and having a first open passage for receiving the stem of the cart, and a clamping arm movably mounted to the block for movement between closed and open positions for securing and releasing the main support member relative to the cart support stem.

7. The attachment defined in claim 6 wherein said block has a second passage and said clamping arm is pivoted at one end to said block and has its opposite extremity received through said second block passage with a portion of said extremity projecting from a surface of the block, and lock means receivable on said projecting extremity of said clamping arm for securement against said surface of the block to thereby secure the clamping arm in closed position.

8. The attachment defined in claim 1 wherein said battery mounting means includes a case having opposite sidewalls and a bottom wall, and a removable cover received over said sidewalls.